(12) United States Patent
Chudgar et al.

(10) Patent No.: US 9,300,578 B2
(45) Date of Patent: Mar. 29, 2016

(54) LARGE RECEIVE OFFLOAD FUNCTIONALITY FOR A SYSTEM ON CHIP

(71) Applicants: Keyur Chudgar, San Jose, CA (US); Kumar Sankaran, San Jose, CA (US)

(72) Inventors: Keyur Chudgar, San Jose, CA (US); Kumar Sankaran, San Jose, CA (US)

(73) Assignee: Applied Micro Circuits Corporation, Santa Clara, CA (US)

( * ) Notice: Subject to any disclaimer, the term of this patent is extended or adjusted under 35 U.S.C. 154(b) by 127 days.

(21) Appl. No.: 13/772,535

(22) Filed: Feb. 21, 2013

(65) Prior Publication Data

US 2014/0233588 A1 Aug. 21, 2014

(51) Int. Cl.
*H04L 12/741* (2013.01)
*H04L 12/891* (2013.01)
*H04L 12/801* (2013.01)
*H04L 12/863* (2013.01)
*H04L 29/06* (2006.01)

(52) U.S. Cl.
CPC ............... *H04L 45/74* (2013.01); *H04L 47/34* (2013.01); *H04L 47/41* (2013.01); *H04L 47/50* (2013.01); *H04L 69/166* (2013.01)

(58) Field of Classification Search
None
See application file for complete search history.

(56) References Cited

U.S. PATENT DOCUMENTS

| | | | |
|---|---|---|---|
| 7,412,488 B2 | 8/2008 | Jha et al. | |
| 7,903,689 B2 | 3/2011 | Niinomi et al. | |
| 7,991,918 B2 | 8/2011 | Jha et al. | |
| 8,306,062 B1 * | 11/2012 | Cohen | H04L 69/161 370/473 |
| 8,325,600 B2 | 12/2012 | Connor et al. | |
| 8,417,852 B2 | 4/2013 | Rajagopalan et al. | |
| 8,462,780 B2 | 6/2013 | Vincent et al. | |
| 8,477,806 B2 | 7/2013 | Qiu et al. | |
| 8,549,152 B2 | 10/2013 | Elzur et al. | |
| 8,565,234 B1 * | 10/2013 | Mizrahi et al. | 370/390 |
| 2003/0048751 A1 * | 3/2003 | Han et al. | 370/231 |
| 2006/0104303 A1 * | 5/2006 | Makineni et al. | 370/463 |
| 2007/0014246 A1 * | 1/2007 | Aloni et al. | 370/252 |
| 2007/0022212 A1 * | 1/2007 | Fan | 709/238 |
| 2007/0064737 A1 * | 3/2007 | Williams | H04L 49/90 370/473 |
| 2007/0076623 A1 * | 4/2007 | Aloni et al. | 370/252 |
| 2007/0086434 A1 * | 4/2007 | Venkatachalam et al. | 370/352 |
| 2007/0255802 A1 * | 11/2007 | Aloni et al. | 709/217 |
| 2008/0310420 A1 * | 12/2008 | Aloni et al. | 370/395.52 |
| 2010/0017535 A1 * | 1/2010 | Aloni et al. | 709/235 |
| 2010/0174824 A1 * | 7/2010 | Aloni et al. | 709/230 |
| 2011/0085549 A1 * | 4/2011 | DiMambro | 370/392 |
| 2011/0246666 A1 * | 10/2011 | Aloni et al. | 709/235 |
| 2011/0310892 A1 * | 12/2011 | DiMambro | 370/389 |
| 2013/0133067 A1 * | 5/2013 | Yoo | 726/23 |
| 2013/0205037 A1 * | 8/2013 | Biswas | 709/232 |
| 2013/0343407 A1 * | 12/2013 | Stroud et al. | 370/474 |

* cited by examiner

*Primary Examiner* — Ayaz Sheikh
*Assistant Examiner* — Peter Chau
(74) *Attorney, Agent, or Firm* — Amin, Turocy & Watson, LLP

(57) ABSTRACT

Various aspects provide large receive offload (LRO) functionality for a system on chip (SoC). A classifier engine is configured to classify one or more network packets received from a data stream as one or more network segments. A first memory is configured to store one or more packet headers associated with the one or more network segments. At least one processor is configured to receive the one or more packet headers and generate a single packet header for the one or more network segments in response to a determination that a gather buffer that stores packet data for the one or more network segments has reached a predetermined size.

20 Claims, 13 Drawing Sheets

LARGE RECEIVE OFFLOAD FUNCTIONALITY FOR A SYSTEM ON CHIP

TECHNICAL FIELD

The subject disclosure relates generally to processing data in a network, and more particularly to implementing large receive offload (LRO) functionality for a system on chip (SoC).

BACKGROUND

The amount of web traffic over the internet is ever-increasing. Much of the increase in web traffic is due to increased social media usage, cloud based storage, online media steaming services, etc. Therefore, the amount of data to be processed by network devices and/or throughput requirements for network devices is ever-increasing. The majority of internet web traffic is Transmission Control Protocol (TCP) based web traffic. However, there is a significant overhead for network devices to process TCP based web traffic. As such, processing TCP based web traffic reduces throughput for network devices and/or reduces network data rates. Additionally, TCP based web traffic increases processing requirements of network devices (e.g., increases central processing unit (CPU) usage for network devices). Therefore, resources for other network applications performed by network devices are reduced (e.g., CPU usage for other network applications is reduced).

One software-based solution is to gather data (e.g., TCP segments) when receiving packets of data. For example, an operating system (e.g., a kernel network stack) of a network device can gather data when receiving packets of data. As such, the number of data packets to be processed by a network device can be reduced. However, this solution still increases processing requirements of the network device (e.g., increases CPU usage for the network device). For example, the CPU of the network device is required to perform the gathering of the data and TCP protocol level functions. Therefore, TCP level protocol processing on the network device (e.g., the CPU) cannot be performed in parallel with the gathering of the data.

The above-described description is merely intended to provide a contextual overview of current techniques for processing data in a network and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a classifier engine, a first memory and at least one processor. The classifier engine is configured to classify one or more network packets received from a data stream as one or more network segments. The first memory is configured to store one or more packet headers associated with the one or more network segments. The at least one processor is configured to receive the one or more packet headers and generate a single packet header for the one or more network segments in response to a determination that a gather buffer that stores packet data for the one or more network segments has reached a predetermined size.

In another example embodiment, a method comprises classifying one or more network packets received from a data stream as one or more network segments. The method also includes storing one or more packet headers associated with the one or more network segments in a first memory. The method also includes storing packet data for the one or more network segments in a gather buffer. The method can also include generating a single packet header for the one or more network segments in response to a determination that the gather buffer that stores the packet data for the one or more network segments has reached a predetermined memory size.

In yet another example embodiment, a system includes a means for means for classifying one or more network packets received from a data stream as one or more network segments. The system also includes a means for storing one or more packet headers associated with the one or more network segments. The system also includes a means for storing packet data for the one or more network segments in a gather buffer. The system can also include a means for generating a single packet header for the one or more network segments in response to a determination that the gather buffer that stores packet data for the one or more network segments has reached a predetermined size.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
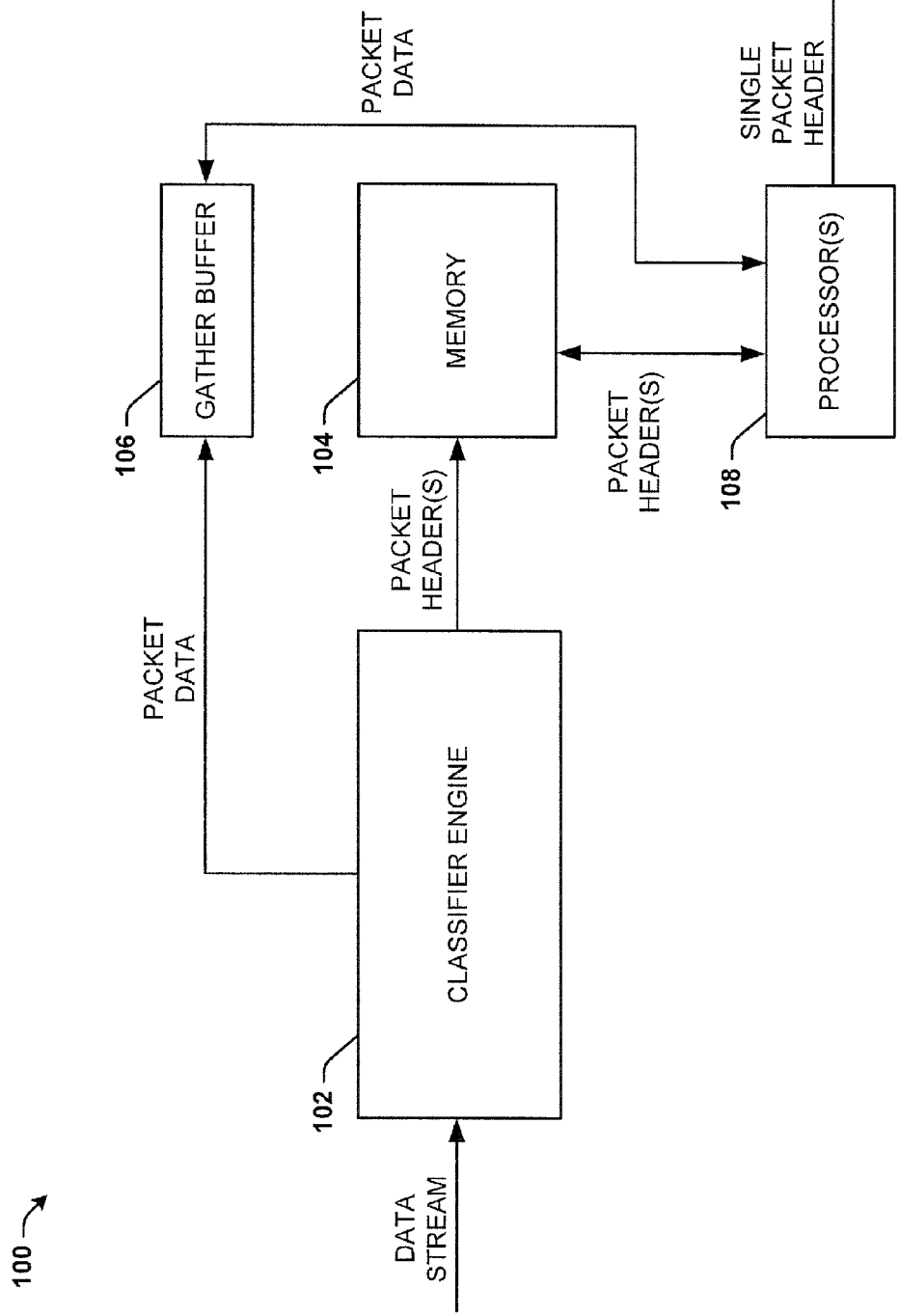
FIG. 1 is a block diagram illustrating an example, non-limiting embodiment of a large receive offload (LRO) system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide large receive offload (LRO) functionality for a system-on-chip (SoC). For example, LRO functionality can be provided without implementing external hardware and/or without a system-level central processing unit (CPU) for a network device (e.g., without affecting system-level software for a network device). In particular, multiple incoming packets can be gathered from a single data stream into a buffer before the packets are provided to a higher-level system networking stack (e.g., system-level CPU). For example, the higher-level system networking stack (e.g., system-level CPU) can implement a higher-level networking protocol. As a result, the number of packets to be processed by the higher-level system networking stack (e.g., system-level CPU) can be reduced. Furthermore, the number of interrupts can also be reduced. Accordingly, system throughput can be increased for Transmission Control Protocol (TCP) data stream traffic. Additionally, CPU utilization can be improved and/or CPU overhead can be reduced.

Turning now to FIG. 1, a block diagram illustrating an example, non-limiting embodiment of a SoC networking system in accordance with various aspects described herein is shown. System 100 includes a classifier engine 102, a memory (e.g., a first memory) 104, a gather buffer 106 and one or more processors 108. The system 100 can be implemented as an LRO system. In one example, the system 100 can be implemented on a SoC. In another example, the system 100 can be implemented on a network device. The system 100 can be employed by various systems, such as, but not limited to network systems, TCP network systems, internet network systems, data center systems, communication systems, router systems, server systems, high availability server systems (e.g., Telecom server systems), Web server systems, file server systems, media server systems, disk array systems, powered insertion board systems, and the like.

The classifier engine 102 can be configured to classify one or more network packets received from a data stream (e.g., DATA STREAM shown in FIG. 1) as one or more network segments (e.g., one or more TCP segments). For example, the classifier engine 102 can determine if an incoming data packet in the data stream is a network segment (e.g., a TCP segment). In one example, the data stream can be a TCP data stream. The classifier engine 102 can be associated with (e.g., can be implemented in) an Ethernet subsystem of the system 100. In one example, the classifier engine 102 can include at least one 1 G network interface and/or at least one 10 G network interface. However, it is to be appreciated that the classifier engine 102 can include different types of network interfaces.

The classifier engine 102 can include one or more rules for a network segment(s). For example, the classifier engine 102 can include one or more rules associated with one or more network socket addresses for a network segment(s). The one or more rules can provide packet identification and/or TCP context for a network segment. In one example, the classifier engine 102 can include one or more LRO rules. For example, the classifier engine 102 can identify a network packet based at least in part on a packet header of the network packet. As such, the classifier engine 102 can identify the type of network packet based at least in part on information included in the packet header of the network packet. Furthermore, the classifier engine 102 can determine whether LRO functionality is configured for a particular network packet. The one or more rules can include a 4-tuple connection key lookup for a network packet. For example, the 4-tuple connection key lookup can include a source internet protocol (IP) address, a destination IP address, a source port and/or a destination port for a network packet. As such, the classifier engine 102 can associate a network packet with a network flow (e.g., a TCP flow) based on the one or more rules.

The classifier engine 102 can be configured to split a network segment (e.g., a TCP segment). For example, the classifier engine 102 can split a network segment into a packet header and packet data. The classifier engine 102 can be configured to send a portion of a network segment (e.g., a packet header) to the memory 104 and/or the one or more processors 108. For example, the classifier engine 102 can send at least a portion of a network segment (e.g., a packet header of the network segment) from the one or more network segments to the memory 104 and/or the one or more processors 108 in response to a determination that the network segment matches the one or more rules (e.g., LRO functionality is configured for the network segment). For example, the classifier engine 102 can send one or more packet headers of one or more network segments (e.g., PACKET HEADER(S) shown in FIG. 1) to the memory 104 and/or the one or more processors 108. The memory 104 can be an on-chip memory. However, it is to be appreciated that the memory 104 can be implemented as a different type of memory. The memory 104 can be configured to store one or more packet headers associated with the one or more network segments.

Additionally, the classifier engine 102 can send packet data (e.g., PACKET DATA shown in FIG. 1) to the gather buffer 106. The packet data can be data in a network segment other than a packet header. In one example, the gather buffer 106 can be implemented as a separate memory. In another example, the gather buffer 106 can be implemented in a memory other than the memory 104 (e.g., a second memory). As such, the gather buffer 106 can store packet data for the one or more network segments. The gather buffer 106 can be associated with a gather list. In one example, the gather list can be stored in the memory 104. In another example, the gather list can be stored in a memory other than the memory 104 (e.g., a second memory). The gather list can include a segment size and/or an address associated with packet data for each of the one or more network segments.

The one or more processors 108 can be configured to receive the one or more packet headers from classifier engine 102 and/or the memory 104. For example, the one or more processors 108 can be configured to implement LRO functionality based on a packet header of a network segment instead of both a packet header and packet data of a network segment. In one example, the one or more processors 108 can be implemented as one or more co-processors (e.g., multiple lightweight co-processors). For example, the one or more processors 108 can be implemented as one or more multiple scalable lightweight intelligent management (MSLIM) co-processors. The one or more processors 108 can be implemented without knowledge of a system-level CPU. For example, the one or more processors 108 can be implemented on an input/output side of the system 100. In one example, the one or more processors 108 can be separated from other components of the system 100 (e.g., the classifier engine 102, the memory 104, the gather buffer 106, etc.) via a network bridge.

The one or more processors 108 can include TCP context for a TCP flow. For example, the one or more processors 108 can determine context for a network segment and/or an expected sequence number (e.g., a predetermined sequence number) for a network segment. The one or more processors 108 can start LRO function for a network segment (e.g., a TCP flow) in response to receiving a packet header (e.g., a TCP header) and/or one or more messages (e.g., generated by a queue manager). A sequence number can be stored in each of the one or more packet headers. As such, packet data for the one or more network segments can be stored in the gather buffer 106 based at least in part on a sequence number stored in each of the one or more packet headers. For example, the packet data for the one or more network segments can be stored in the gather buffer 106 in response to a determination that a sequence number associated with a particular network packet matches the expected sequence number for the particular network packet. Therefore, the one or more processors 108 can store packet data for a network segment in response to a determination that a sequence number for the network segment is valid.

The one or more processors 108 can additionally be configured to generate a single packet header (e.g., SINGLE PACKET HEADER shown in FIG. 1) for the one or more network segments. In one example, the one or more processors 108 can generate a single packet header for the one or more network segments in response to a determination that the gather buffer 106 has reached a predetermined size (e.g., a predetermined memory size, a predetermined memory capacity, a predetermined segment size, etc.). For example, the predetermined size can be 16K, 32K, 64K etc. However, it is to be appreciated that the predetermined size can be any different memory size. In another example, the one or more processors 108 can generate a single packet header for the one or more network segments in response to a determination that a flow timeout has occurred. In yet another example, the one or more processors 108 can generate a single packet header for the one or more network segments in response to a determination that a sequence number for a network segment is invalid. For example, if a sequence number for a network segment does not match a predetermined sequence number for the network segment, a single packet header can be generated for the previously stored packet data in the gather buffer 106 (e.g., the single packet header can be generated for the network segments processed before the network segment with the invalid segment number).

The one or more processors 108 can append the single packet header to the packet data stored in the gather buffer 106. In one embodiment, the one or more processors 108 can append the single packet header to the packet data stored in the gather buffer 106 in response to a determination that the gather buffer 106 has reached the predetermined size. In another embodiment, the one or more processors 108 can append the single packet header to the packet data stored in the gather buffer 106 in response to a determination that a flow timeout has occurred (e.g., a system-level CPU has generated a flow timeout). In yet another example, the one or more processors 108 can append the single packet header to the packet data stored in the gather buffer 106 in response to a determination that a sequence number for a network segment is invalid. As such, the one or more processors 108 can generate a new network segment (e.g., a single network segment) that includes the single packet header and packet data stored in the gather buffer 106. Additionally, the one or more processors 108 can send the new network segment to at least one system-level CPU. As such, the number of network packets processed by the at least one system-level CPU can be reduced. In addition, the one or more processors 108 can erase data stored in the memory 104 and/or the gather buffer 106. For example, the one or more processors 108 can free up any memory which is not required in the memory 104 (e.g., temporary TCP headers) and/or the gather buffer 106.

Figure 2:
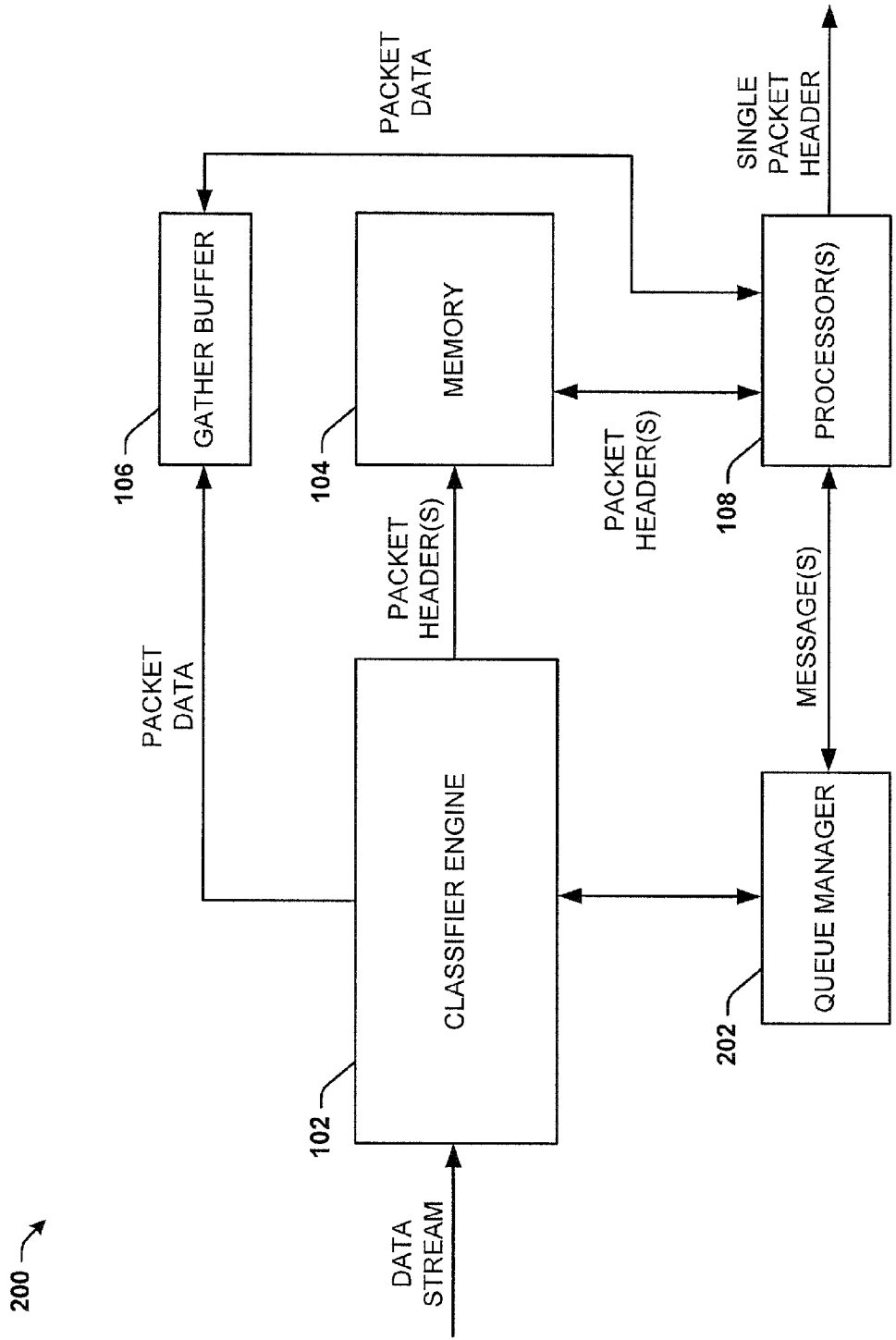
FIG. 2 is a block diagram illustrating an example, non-limiting embodiment of a LRO system implementing a queue manager in accordance with various aspects described herein.

Referring now to FIG. 2, a block diagram illustrating another example, non-limiting embodiment of a SoC networking system in accordance with various aspects described herein is shown. System 200 includes the classifier engine 102, the memory (e.g., a first memory) 104, the gather buffer 106, the one or more processors 108 and a queue manager 202.

The queue manager 202 can send one or more messages (e.g., MESSAGE(S) shown in FIG. 2) associated with the one or more packet headers to the one or more processors 108. For example, in response to the one or more processors 108 receiving a packet header for a network segment, the queue manager 202 can send one or more messages associated with the network segment to the one or more processors 108. The queue manager 202 can be a central queue manager implemented in an Ethernet subsystem and/or a queue manager subsystem of the system 200. In one example, the queue manager 202 can be implemented as a hardware component. The queue manager 202 can manage enqueue and/or dequeue of messages (e.g., messages in one or more queues) for the one or more processors 108. Additionally or alternatively, the queue manager 202 can divide processing (e.g., processing of the one or more packet headers, LRO processing, etc.) among the one or more processors 108.

Figure 3:
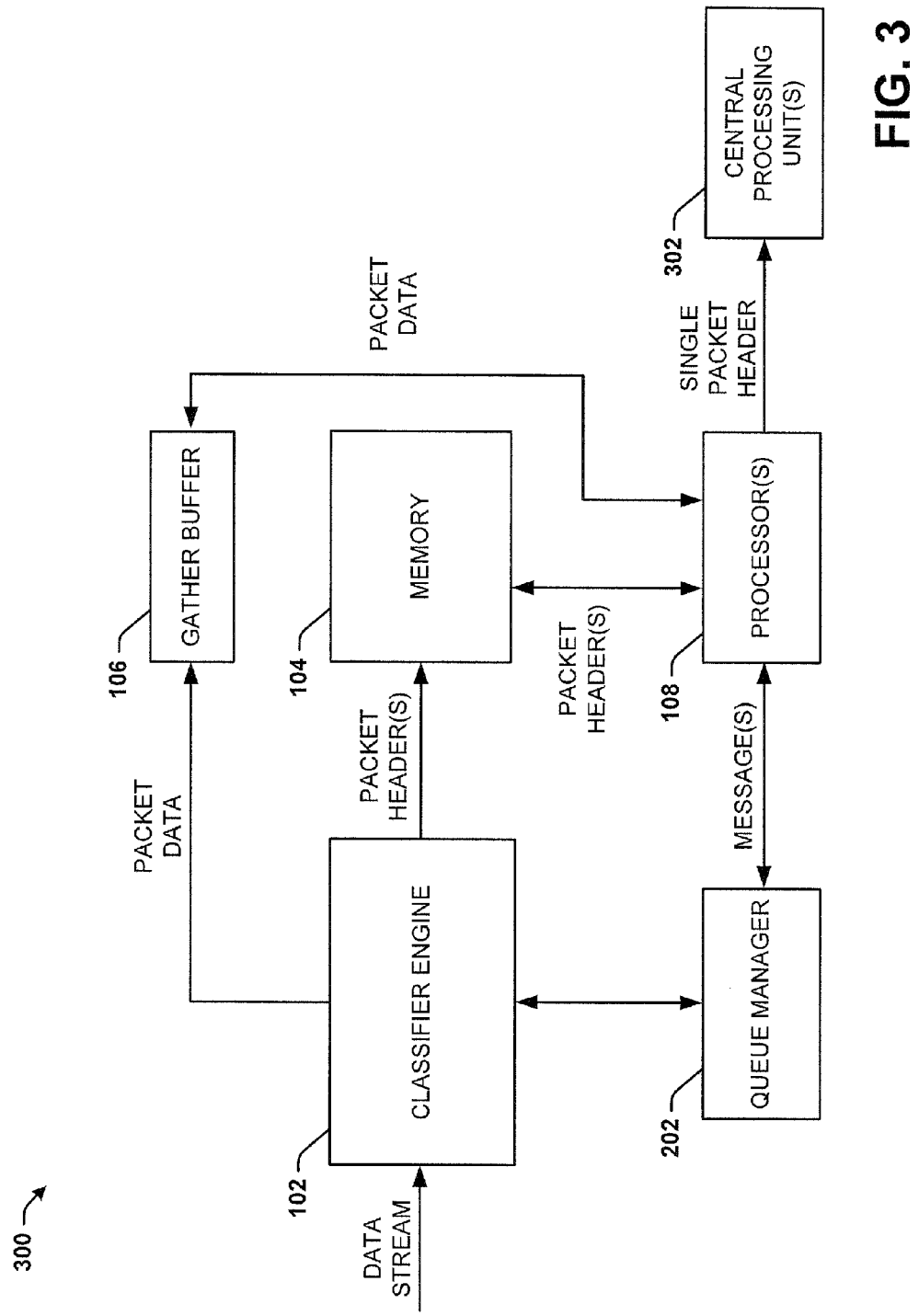
FIG. 3 is a block diagram illustrating an example, non-limiting embodiment of a LRO system implementing at least one system-level central processing unit in accordance with various aspects described herein.

Turning now to FIG. 3, illustrated is a block diagram of another example, non-limiting embodiment of a SoC networking system in accordance with various aspects described herein. System 300 includes the classifier engine 102, the memory (e.g., a first memory) 104, the gather buffer 106, the one or more processors 108, the queue manager 202 and at least one CPU 302.

The at least one CPU 302 can be implemented as a system CPU (e.g., a system-level CPU). The at least one CPU 302 can run a main operating system (OS) for the system 300 (e.g., run a main OS for a network device). The at least one CPU 302 can run a higher-level network protocol (e.g., a higher-level system networking stack) and/or higher-level network applications than the one or more processors 108. For example, the at least one CPU 302 can run a higher-level TCP based protocol and/or network applications than the one or more processors 108. The at least one CPU 302 can be unaware of an LRO application implemented on the one or more processors 108. For example, LRO functionality can be performed by the one or more processors 108 the knowledge of the TCP protocol implemented by the at least one CPU 302. Additionally, the at least one CPU 302 can be configured to generate a flow timeout and/or send a flow timeout to the one or more processors 108.

The at least one CPU 302 can receive the new network segment (e.g., the single network segment) that includes the single packet header and the packet data for the one or more networks segments from the one or more processors 108. In one example, the at least one CPU 302 can process the new network segment while the one or more processors 108 gather other network segments (e.g., other network packets). For example, the at least one CPU 302 can process the new network segment in parallel with the one or more processors 108 implementing LRO functionality. As such, network segment processing by the at least one CPU 302 (e.g., the number of network segments processed by the at least one CPU 302) can be reduced. Furthermore, the at least one CPU 302 can processes only one network segment without requiring changes in the OS network stack of the at least one CPU 302. Additionally, TCP level protocol processing by the at least one CPU 302 can be performed in parallel with LRO functionality. Also, since all the components required for LRO functionality (e.g., the classifier engine 102, the one or more processors 108, the queue manager 202, etc.), external hardware adapter(s) are not needed in order to obtain LRO functionality.

In a non-limiting example, if the classifier engine 102 receives 512 bytes of data for TCP segments from the data stream and the predetermined size is 64K, then the network segment processing for the at least one CPU 302 can be reduced by 128 (e.g., 128 TCP segments can be gathered into single 64K TCP segment for processing by the at least one CPU 302). Thus, the system 300 can increase network segment throughput and/or reduce usage of the at least one CPU 302.

Figure 4:
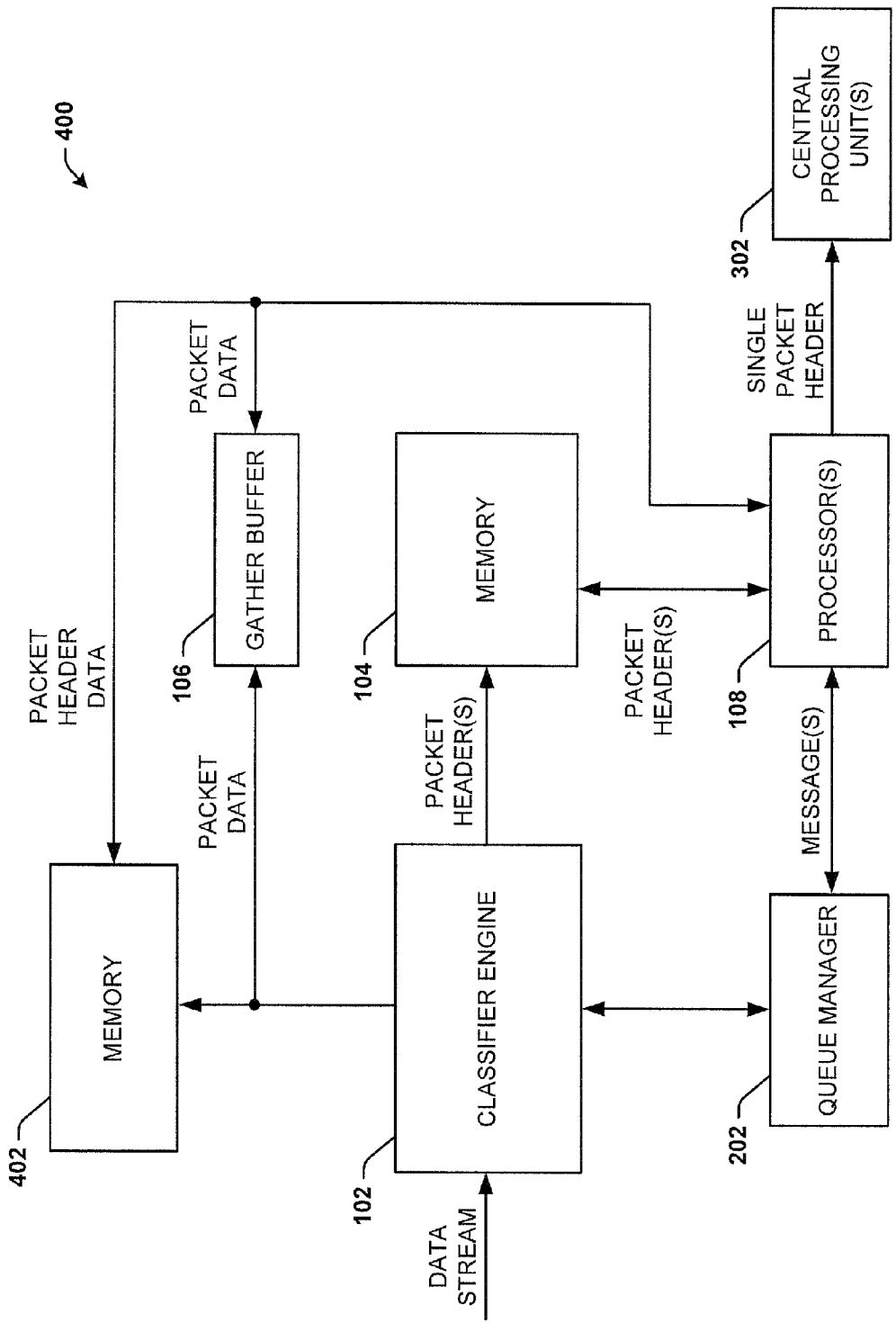
FIG. 4 is a block diagram illustrating an example, non-limiting embodiment of a LRO system implementing multiple memories in accordance with various aspects described herein.

Turning now to FIG. 4, illustrated is a block diagram of another example, non-limiting embodiment of a SoC networking system in accordance with various aspects described herein. System 400 includes the classifier engine 102, the memory (e.g., a first memory) 104, the gather buffer 106, the one or more processors 108, the queue manager 202, the at least one CPU 302 and a memory (e.g., a second memory) 402.

The memory 402 can be implemented as a system memory (e.g., a system-level memory). In one example, the memory 402 can be a double data rate (DDR) system memory. However, it is to be appreciated that the memory 402 can be implemented as a different type of system memory. In one example, the packet data for the one or more network segments can be stored in the memory 402. For example, the gather buffer 106 can be implemented in the memory 402. As such, the memory 402 can store packet data for the one or ore network segments to allow a new network segment (e.g., a larger network segment) to be generated. In one example, a segment size and/or a memory address for each of the one or more packet headers can be stored in the memory 402.

Figure 5:
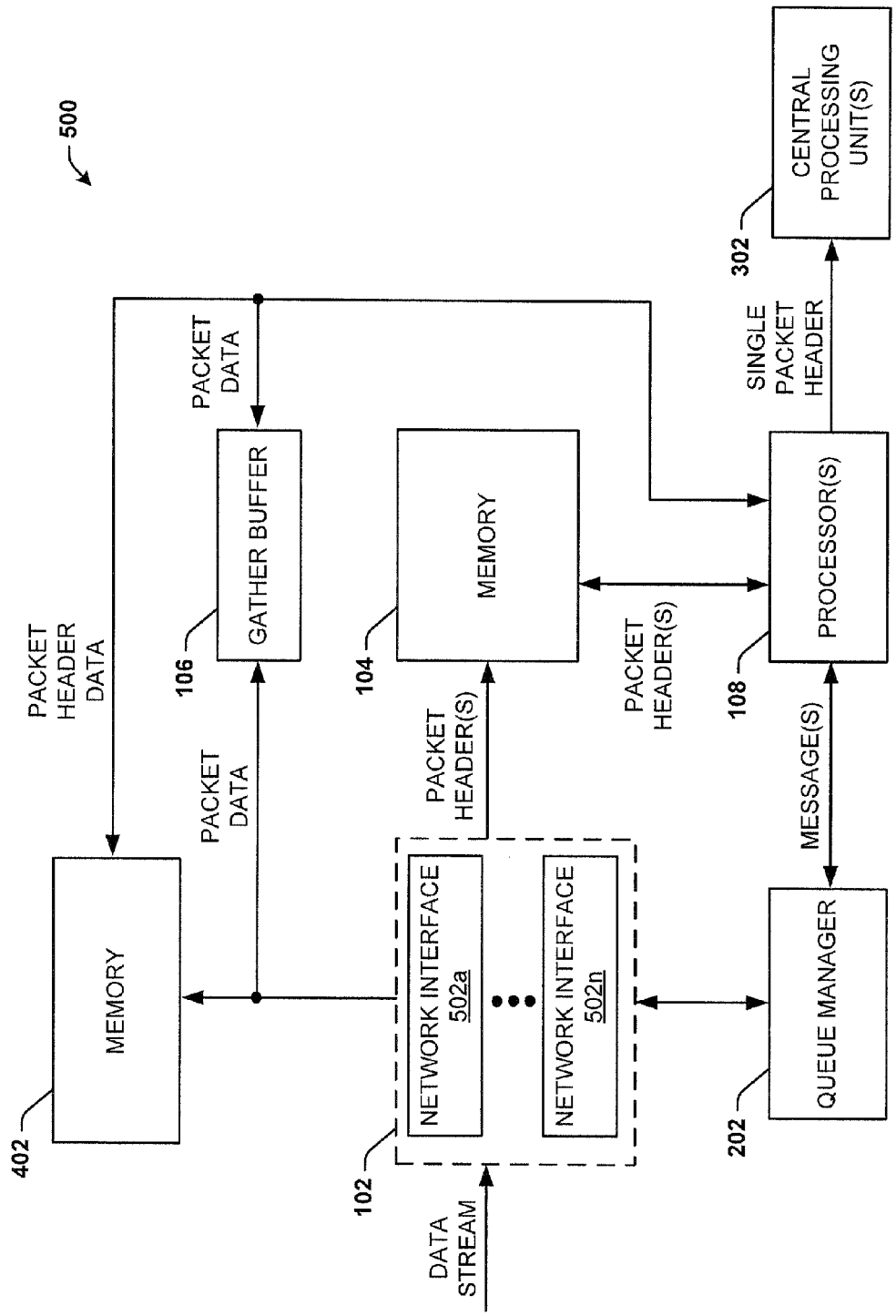
FIG. 5 is a block diagram illustrating an example, non-limiting embodiment of a LRO system with one or more network interfaces in accordance with various aspects described herein.

Referring now to FIG. 5, illustrated is a block diagram of another example, non-limiting embodiment of a SoC networking system in accordance with various aspects described herein. System 500 includes the classifier engine 102, the memory (e.g., a first memory) 104, the gather buffer 106, the one or more processors 108, the queue manager 202, the at least one CPU 302 and the memory (e.g., the second memory) 402. The classifier engine 102 includes one or more network interfaces 502*a-n*.

The one or more network interfaces 502*a-n* can be configured to receive one or more network packets. The one or more network interfaces 502*a-n* can be configured to implement one or more network protocols (e.g., a TCP protocol, etc.). The one or more network interfaces 502*a-n* can be associated with (e.g., can be implemented in) an Ethernet subsystem of the system 500. In one example, the one or more network interfaces 502*a-n* can include at least one 1 G network interface (e.g., 1 G Ethernet interface) and/or at least one 10 G network interface (e.g., 10 G Ethernet interface). However, it is to be appreciated that the one or more network interfaces 502*a-n* can implement different types of data rates and/or network protocols. In one example, the one or more network interfaces 502*a-n* can be implemented as on-chip network interfaces.

Figure 6:
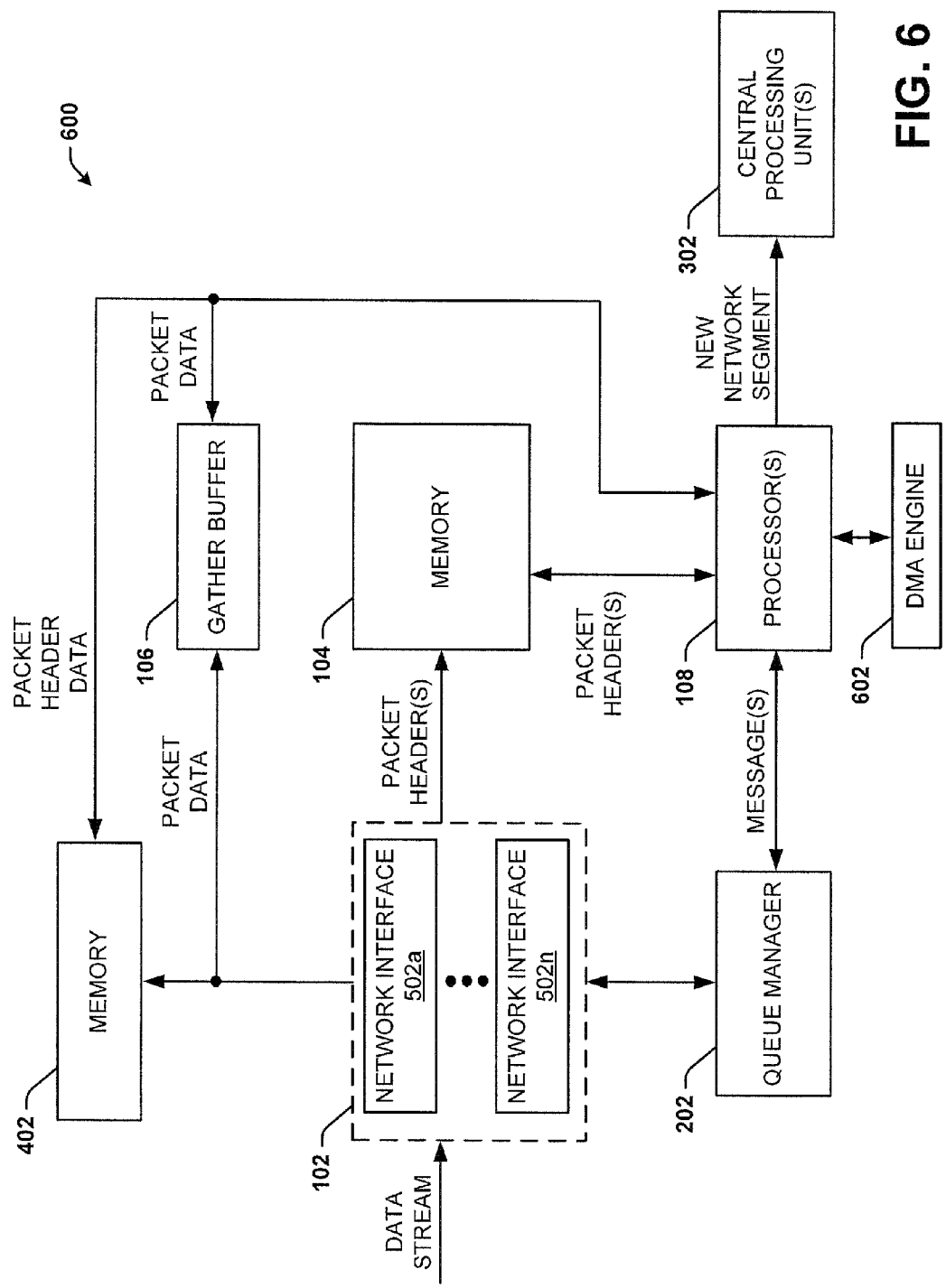
FIG. 6 is a block diagram illustrating an example, non-limiting embodiment of a LRO system implementing a direct memory access engine in accordance with various aspects described herein.

Turning now to FIG. 6, illustrated is a block diagram of another example, non-limiting embodiment of a SoC networking system in accordance with various aspects described herein. System 600 includes the classifier engine 102, the memory (e.g., a first memory) 104, the gather buffer 106, the one or more processors 108, the queue manager 202, the at least one CPU 302, the memory (e.g., the second memory) 402 and a direct memory access (DMA) engine 602. The classifier engine 102 includes the one or more network interfaces 502*a-n*.

The DMA engine 602 can be configured to perform a packet gather operation. For example, the DMA engine 602 can perform a packet gather operation in response to a determination that the gather buffer has reached a predetermined size or a flow timeout has occurred. The DMA engine 602 can gather packet data (e.g., packet data from the gather buffer 106) into a single data segment. As such, the DMA engine 602 can generate a single data segment from packet data of the one or more network segments. The one or more processors 108 can append the single data segment generated by the DMA engine 602 to the single packet header generated by the one or more processors 108. As such, the one or more processors 108 can generate a new network segment (e.g., NEW NETWORK SEGMENT shown in FIG. 6) that includes the single packet header and the single data segment generated by the DMA engine 602.

Figure 7:
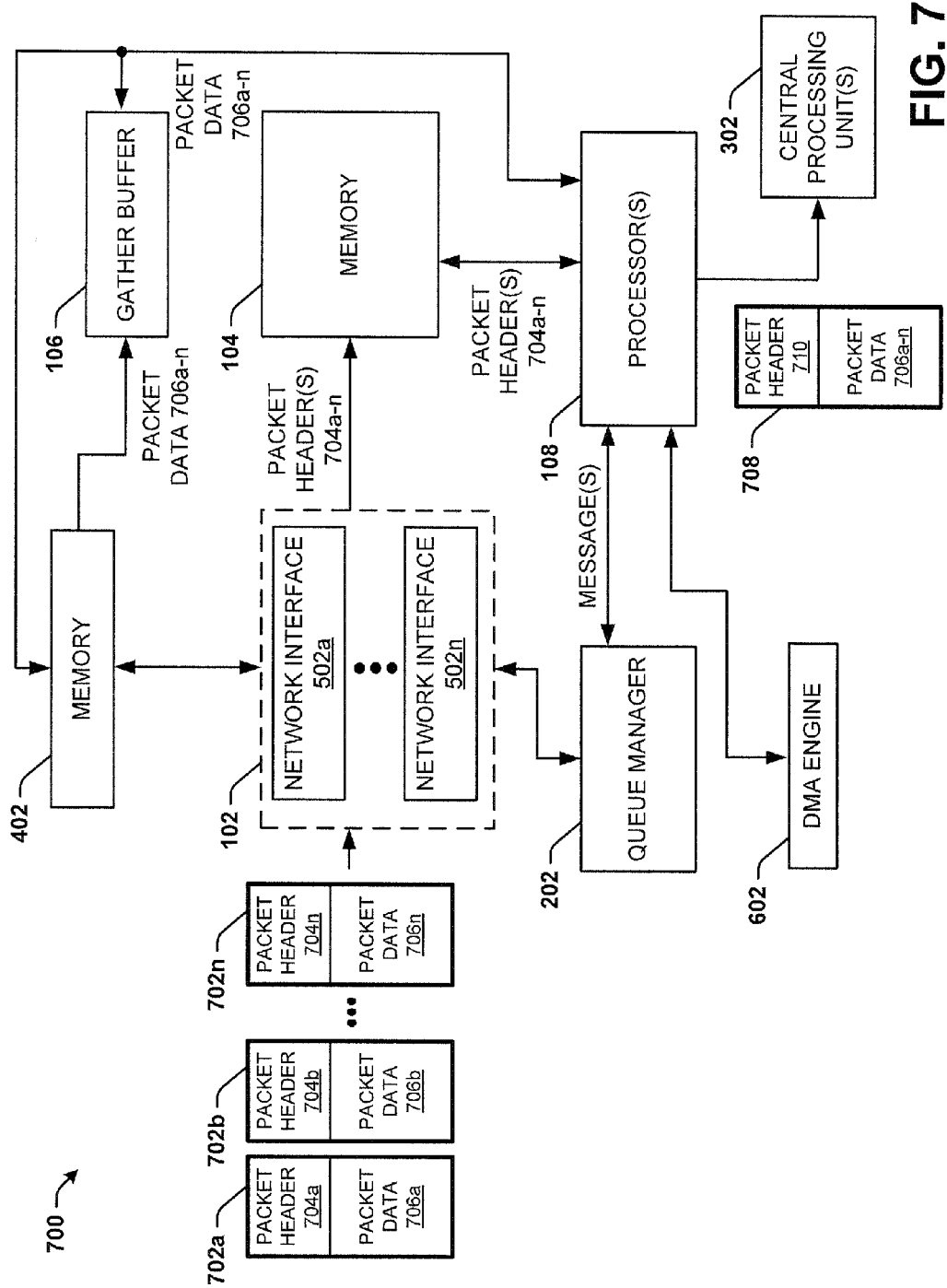
FIG. 7 is a block diagram illustrating an example, non-limiting embodiment of a LRO system for generating a network packet segment in accordance with various aspects described herein.

Turning now to FIG. 7, illustrated is an example, non-limiting embodiment of a system for providing LRO functionality in accordance with various aspects described herein. System 700 includes the classifier engine 102, the memory (e.g., a first memory) 104, the gather buffer 106, the one or more processors 108, the queue manager 202, the at least one CPU 302, the memory (e.g., the second memory) 402 and the DMA engine 602. The classifier engine 102 includes the one or more network interfaces 502*a-n*.

The classifier engine 102 (e.g., the one or more network interfaces 502*a-n*) can receive one or more network segments 702*a-n*. For example, the one or more segments 702*a-n* can be identified from incoming network packets in a data stream. In one example, the one or more network segments 702*a-n* can be TCP segments. Each of the network segments 702*a-n* can include a packet header and packet data. For example, the network segment 702*a* can include a packet header 704*a* and packet data 706*a*, the network segment 702*b* can include a packet header 704*b* and packet data 706*b*, etc. As such, the one or more network segments 702*a-n* can include packet headers 704*a-n* and packet data 706*a-n*.

The classifier engine 102 can split each of the network segments 702*a-n*. The classifier engine 102 can copy the packet headers 704*a-n* to the memory 104 (e.g., store the packet headers 704*a-n* in the memory 104). In one example, the memory 104 can be an on-chip memory. Additionally or alternatively, the classifier engine 102 can send the packet headers 704*a-n* to the one or more processors 108.

The one or more processors 108 can receive the packet headers 704*a-n* from the classifier engine 102 and/or the memory 104. If a sequence number of a packet header from the packet headers 704*a-n* matches a predetermined sequence number, the one or more processors 108 and/or the classifier engine 102 can copy packet data associated with the packet header (e.g., the packet data 706*a-n*) to the gather buffer 106 (e.g., store the packet data 706*a-n* in the gather buffer 106). In one example, the gather buffer 106 can be implemented as a separate memory. In another example, the gather buffer 106 can be implemented in the memory 402 (e.g., system memory 402). Additionally, the one or more processors 108 and/or the classifier engine 102 can store packet header data associated with the packet headers 704*a-n* in the memory 402. For example, the one or more processors 108 and/or the classifier engine 102 can store a segment size and/or an address for the network segments 702*a-n* in the memory 402. The segment size and/or an address for the network segments 702*a-n* can be included in the packet headers 704*a-n*.

In response to a determination that the gather buffer 106 has reached a predetermined size or a flow timeout (e.g., a flow timeout generated by the at least one CPU 302) has occurred, the one or more processors 108 can stop processing the packet headers 704*a-n*. Additionally, the DMA engine 602 can start a packet gather operation. For example, the DMA engine 602 can generate a single data segment comprising the packet data 706*a-n*. Once the DMA engine 602 completes the packet gather operation (e.g., generates the single data segment comprising the packet data 706*a-n*), the one or more processors 108 can append the single data segment (e.g., packet data 706*a-n*) to a packet header 710. The packet header 710 can be a single packet header (e.g., a new packet header) for the packet data 706*a-n*. As such, the one or more processors can generate a new network segment (e.g., single network segment) 708 that includes the packet header 710 and the packet data 706*a-n*. Additionally, the one or more processors 108 can send the new network segment 708 to the at least one CPU 302.

In view of the example systems described above, methods that may be implemented in accordance with the described subject matter may be better appreciated with reference to the flow charts of FIGS. 8-11. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 8:
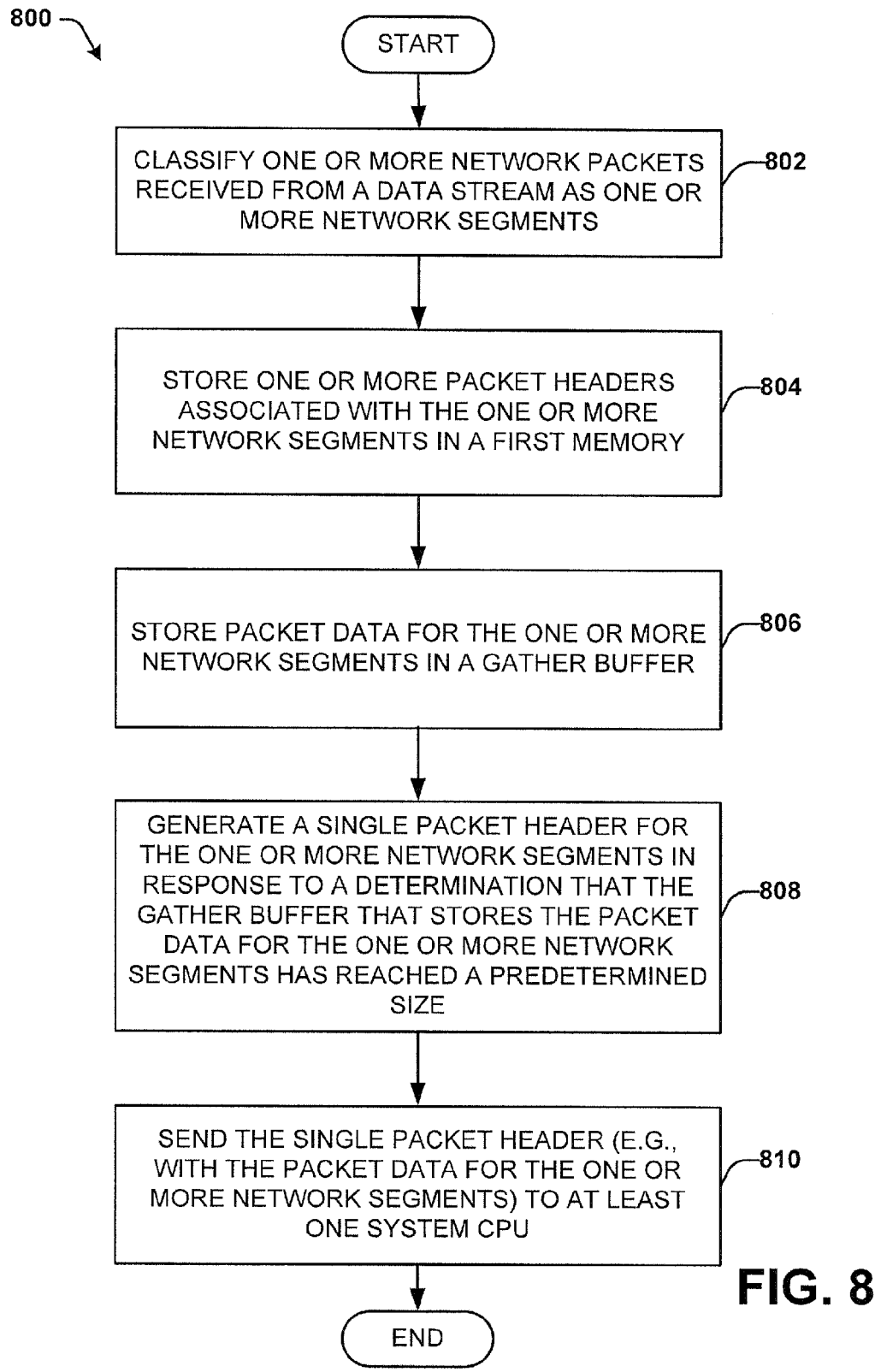
FIG. 8 illustrates a flow diagram of an example, non-limiting embodiment of a method for implementing LRO functionality on a system on chip (SoC).

Referring to FIG. 8, a flow diagram of an example, non-limiting embodiment of a method for providing large receive offload (LRO) functionality is shown. Method 800 can begin at block 802, where one or more network packets received from a data stream are classified (e.g., using a classifier engine 102) as one or more network segments. For example, one or more incoming packets in a data stream can be classified as one or more TCP segments.

At block 804, one or more packet headers associated with the one or more network segments are stored in a first memory (e.g., a memory 104). For example, a TCP header for each of the one or more TCP segments can be stored in an on-chip memory.

At block 806, packet data for the one or more network segments are stored in a gather buffer (e.g., a gather buffer 106). For example, packet data each of the one or more TCP segments can be stored in a gather buffer. In one example, the gather buffer can be located in a system memory. In another example, the gather buffer can be located in an on-chip memory. In yet another example, the gather buffer can be implemented as a separate memory.

At 808, a single packet header is generated (e.g., using one or more processors 108) for the one or more network segments in response to a determination that the gather buffer that stores the packet data for the one or more network segments has reached a predetermined size. For example, a new TCP packet header can be generated for the packet data (e.g., the packet data for the one or more network segments) in response to a determination that the gather buffer that stores the packet data for the one or more network segments has reached a predetermined memory size.

At 810, the single packet header (e.g., with the packet data for the one or more network segments) is sent (e.g., using one or more processors 108) to at least one system CPU. For example, the one or more processors 108 can send a new TCP segment that includes a single TCP header and the packet data for the one or more TCP segments to at least one CPU (e.g., at least one CPU that runs a main operating system and a high-level TCP based protocol and/or application(s)).

Figure 9:
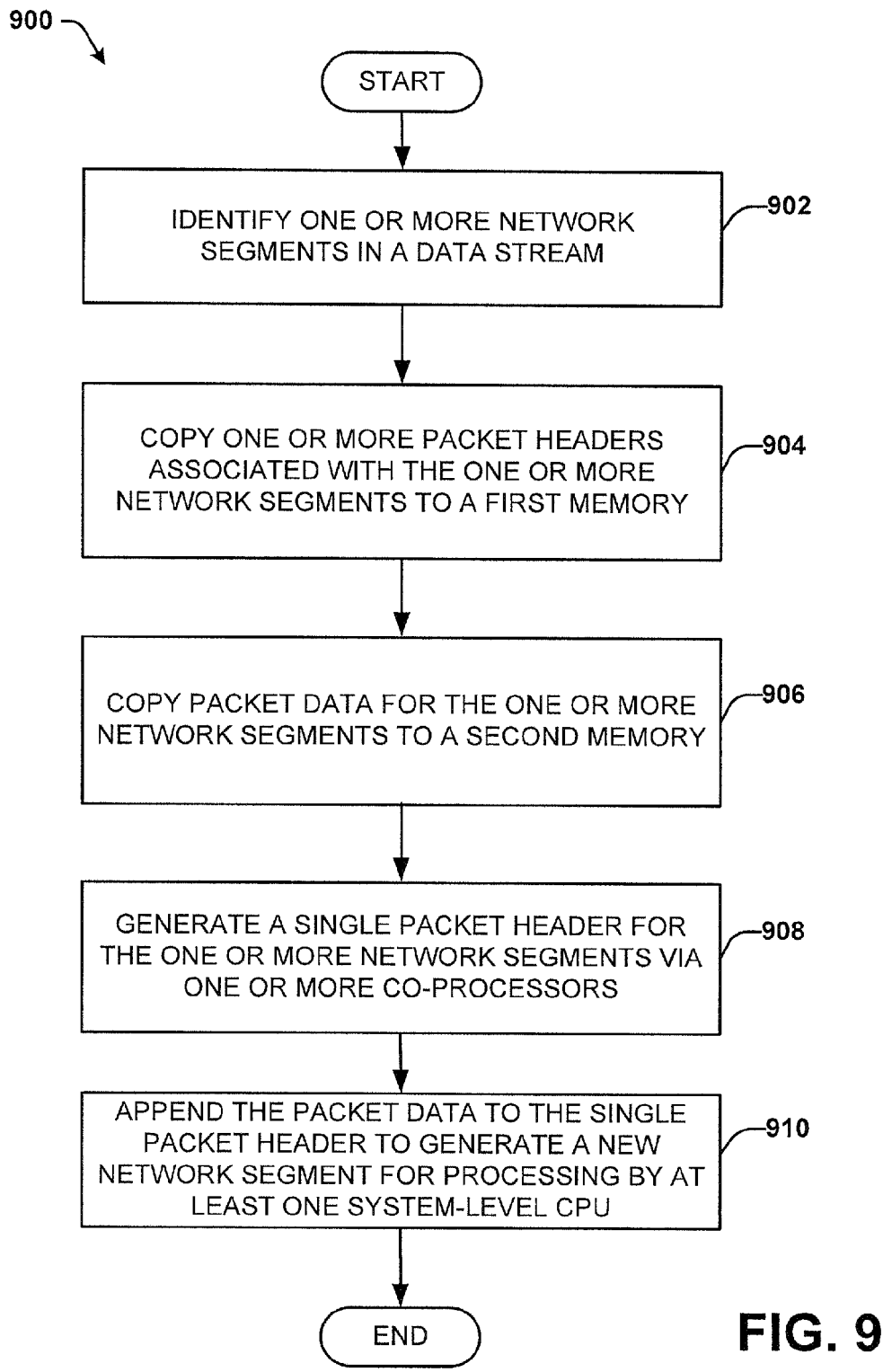
FIG. 9 illustrates a flow diagram of another example, non-limiting embodiment of a method for implementing LRO functionality on a SoC.

Referring now to FIG. 9, a flow diagram of another example, non-limiting embodiment of a method for providing large receive offload (LRO) functionality is shown. Method 900 can begin at block 902, where one or more network segments are identified (e.g., using a classifier engine 102) in a data stream. For example, one or more incoming packets in a data stream can be classified as one or more TCP segments.

At block 904, one or more packet headers associated with the one or more network segments are copied to a first memory (e.g., a memory 104). For example, a TCP header for each of the one or more TCP segments can be stored in an on-chip memory.

At block 906, packet data for the one or more network segments are copied to a second memory (e.g., a gather buffer 106 and/or a memory 402). For example, packet data each of the one or more TCP segments can be stored in a gather buffer in a second memory. In one example, the second memory can be a system memory.

At 908, a single packet header is generated for the one or more network segments via one or more co-processors (e.g., via one or more processors 108). For example, a single packet header can be generated (e.g., by the one or more processors 108) in response to a determination that a gather buffer that stores the packet data for the one or more network segments has reached a predetermined size or a flow timeout received from at least one CPU has occurred. In one example, a new TCP packet header can be generated (e.g., by the one or more processors 108) for the packet data (e.g., the packet data for the one or more network segments) in response to a determination that a gather buffer that stores the packet data for the one or more network segments has reached a predetermined memory size or a flow timeout received from at least one CPU has occurred.

At 910, the packet data is appended (e.g., using one or more processors 108) to the single packet header to generate a new network segment for processing by at least one system-level CPU. For example, the one or more processors 108 can send a new TCP segment that includes a single TCP header and the packet data for the one or more TCP segments to at least one CPU (e.g., the least one CPU 302 that runs a main operating system and a high-level TCP based protocol and/or application(s)). In one example, the at least one system-level CPU can run a higher-level networking protocol than the one or more co-processors.

Figure 10:
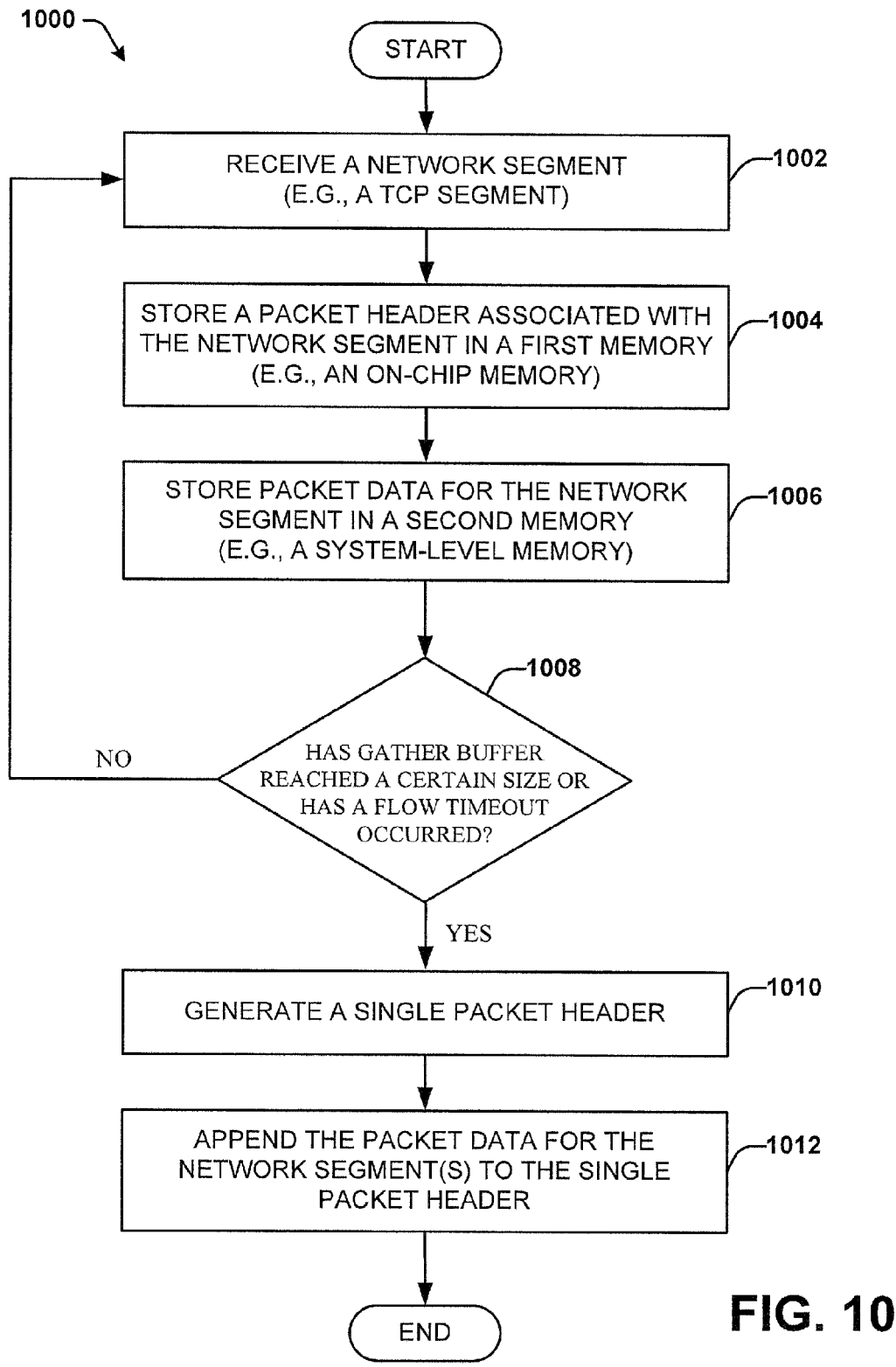
FIG. 10 illustrates a flow diagram of an example, non-limiting embodiment of a method for implementing LRO functionality on a SoC.

Referring now to FIG. 10, a flow diagram of yet another example, non-limiting embodiment of a method for providing large receive offload (LRO) functionality is shown. Method 900 can begin at block 1002, where a network segments is received (e.g., by a classifier engine 102). For example, an incoming packet in a data stream can be classified as a TCP segment.

At block 1004, a packet header associated with the network segment is stored in a first memory (e.g., an on-chip memory). For example, a TCP header for the TCP segment can be stored in an on-chip memory (e.g., memory 104).

At block 1006, packet data for the network segment is stored in a second memory (e.g., a system-level memory). For example, packet data for the TCP segments can be stored in a gather buffer in a second memory (e.g., memory 402).

At block 1008, it is determined (e.g., by one or more processors 108) whether a gather buffer has reached a certain size or if a flow timeout has occurred. For example, the one or more processors 108 can determine whether a gather buffer that stores packet data for one or more TCP segments has reached a certain size (e.g., a certain memory capacity) or if a CPU (e.g., the at least one CPU 302) has generated a flow timeout. If no, the method 900 can return to block 1002. If yes, the method 900 can proceed to block 1010.

At 1010, a single packet header is generated (e.g., using one or more processors 108). For example, a new TCP packet header can be generated for the packet data (e.g., the packet data stored in the second memory).

At 1012, the packet data for the network segment(s) is appended (e.g., using one or more processors 108) to the single packet header. For example, the TCP packet header can be appended to the packet data stored in the second memory to generate a new TCP segment. In example, the one or more processors 108 can send the new TCP segment to at least one CPU (e.g., at least one CPU that runs a main operating system and a high-level TCP based protocol and/or application(s)).

Figure 11:
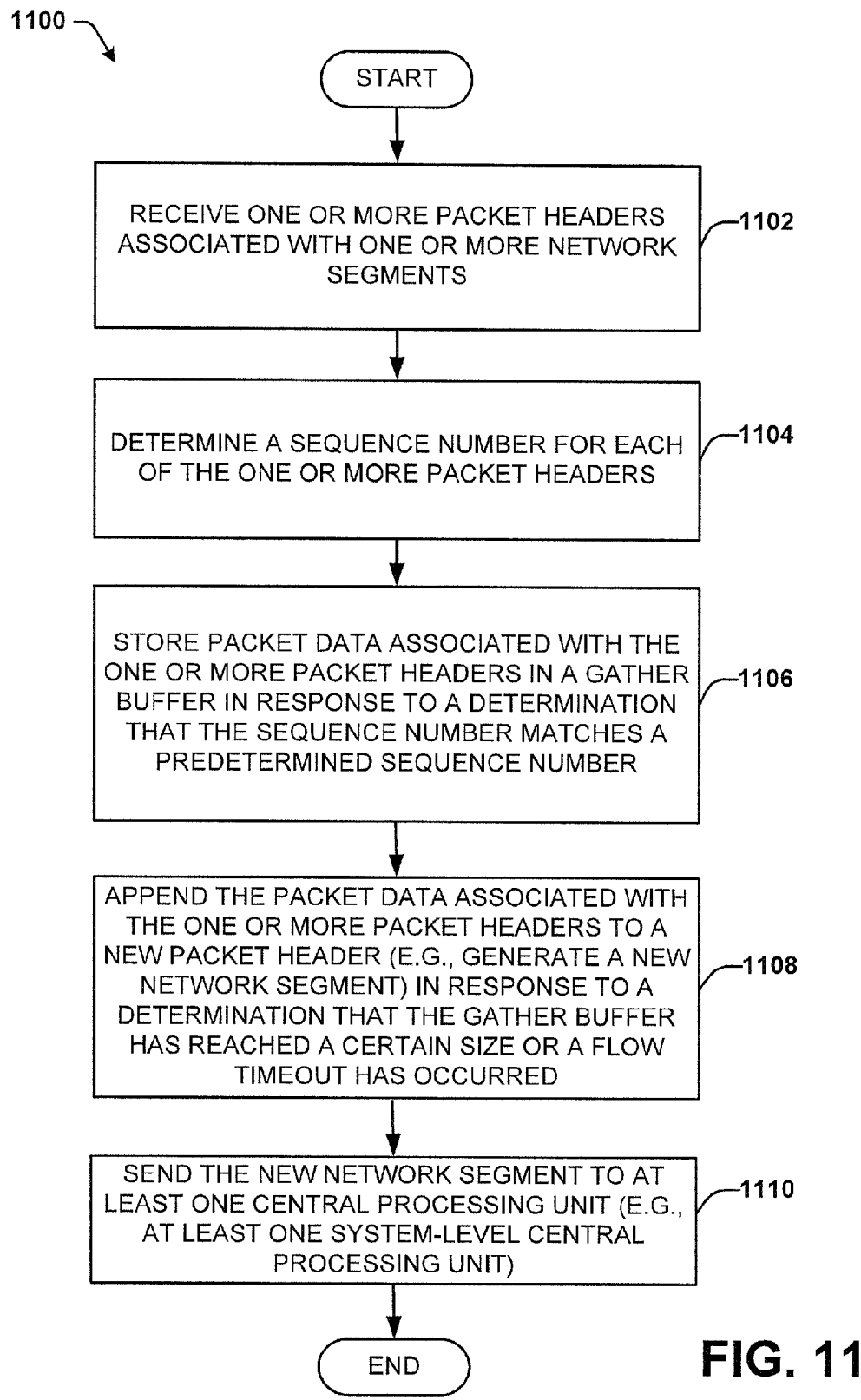
FIG. 11 illustrates a flow diagram of another example, non-limiting embodiment of a method for implementing LRO functionality via one or more co-processors.

Referring now to FIG. 11, a flow diagram of an example, non-limiting embodiment of a method for providing large receive offload (LRO) functionality via one or more co-processors (e.g., one or more MSLIM co-processors) is shown. Method 1100 can begin at block 1102, where one or more packet headers associated with one or more network segments are received (e.g., by one or more processors 108). For example, a TCP header for one or more TCP segments can be received by one or more co-processors (e.g., one or more MSLIM co-processors).

At 1104, a sequence number for each of the one or more packet headers is determined (e.g., using one or more processors 108). For example, the one or more processors 108 can determine a sequence number for each of the one or more TCP segments. A sequence number for a TCP segment can be included in a TCP header for the TCP segment.

At block 1106, packet data associated with the one or more packet headers is stored (e.g., using one or more processors 108) in a gather buffer in response to a determination that the sequence number matches a predetermined sequence number. For example, if a sequence number for a TCP segment matches a predetermined segment number for the TCP segment, the one or more processors 108 can store packet data for the TCP segment in a gather buffer. Additionally, the one or more processors 108 can store a segment size and/or a memory address for the TCP segment in system memory in response to a determination that the sequence number matches a predetermined sequence number.

At 1108, the packet data associated with the one or more packet headers is appended (e.g., using one or more processors 108) to a new packet header in response to a determination that the gather buffer has reached a certain size or a flow timeout has occurred. For example, a new network segment is generated in response to a determination that the gather buffer has reached a certain size or a flow timeout has occurred. In one example, a new TCP packet header can be generated for the packet data (e.g., the packet data for the one or more TCP segments) in response to a determination that the gather buffer has reached a certain size or a flow timeout has occurred. For example, the one or more processors 108 can determine whether the gather buffer that stores packet data for one or more TCP segments has reached a certain size (e.g., a certain memory capacity) or if a CPU (e.g., the at least one CPU 302) has generated a flow timeout.

At 1110, the new network segment is sent (e.g., using one or more processors 108) to at least one central processing unit. For example, the at least one system central processing unit can be at least one system-level central processing unit. In one example, the one or more processors 108 can send a new TCP segment that includes a single TCP header and the packet data for the one or more TCP segments to at least one CPU (e.g., at least one CPU that runs a main operating system and a high-level TCP based protocol and/or application(s)).

Example Computing Environment

Figure 12:
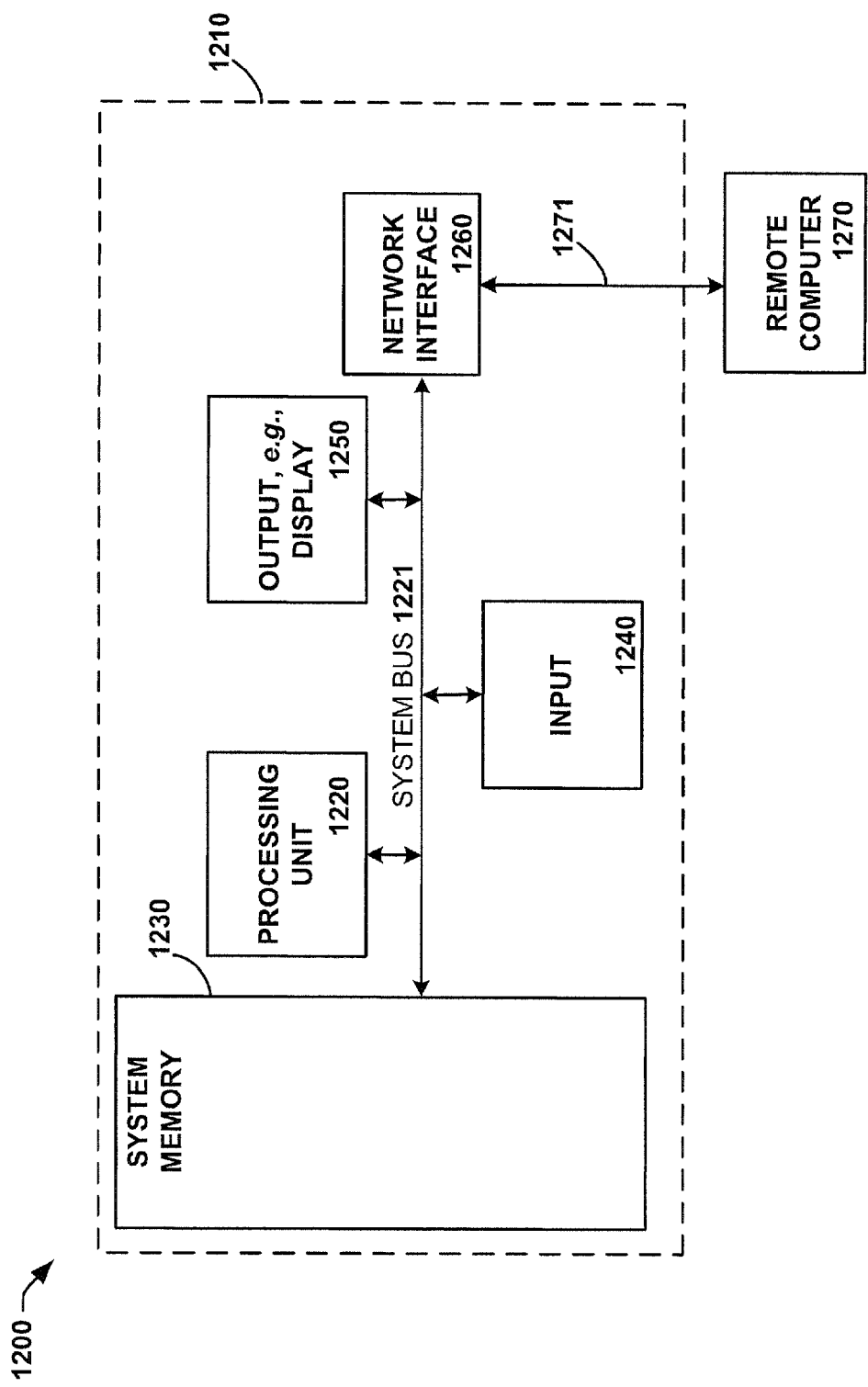
FIG. 12 illustrates a block diagram of an example electronic computing environment that can be implemented in conjunction with one or more aspects described herein.

As mentioned, advantageously, the techniques described herein can be applied to any device where it is desirable to facilitate large receive offload functionality. It is to be understood, therefore, that handheld, portable and other computing devices and computing objects of all kinds are contemplated for use in connection with the various non-limiting embodiments, i.e., anywhere that a device may wish to implement large receive offload functionality. Accordingly, the below general purpose remote computer described below in FIG. 12 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 12 thus illustrates an example of a suitable computing system environment 1200 in which some aspects of the disclosed subject matter can be implemented, although as made clear above, the computing system environment 1200 is only one example of a suitable computing environment for a device and is not intended to suggest any limitation as to the scope of use or functionality of the disclosed subject matter. Neither should the computing environment 1200 be interpreted as having any dependency or requirement relating to any one or combination of components illustrated in the exemplary operating environment 1200.

With reference to FIG. 12, an exemplary device for implementing the disclosed subject matter includes a general-purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures.

Computer 1210 typically includes a variety of computer readable media. Computer readable media can be any available media that can be accessed by computer 1210. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media typically embodies computer readable instructions, data structures, program modules, or other data in a modulated data signal such as a carrier wave or other transport mechanism and includes any information delivery media.

The system memory 1230 may include computer storage media in the form of volatile and/or nonvolatile memory such as read only memory (ROM) and/or random access memory (RAM). A basic input/output system (BIOS), containing the basic routines that help to transfer information between elements within computer 1210, such as during start-up, may be stored in memory 1230. Memory 1230 typically also contains data and/or program modules that are immediately accessible to and/or presently being operated on by processing unit 1220. By way of example, and not limitation, memory 1230 may also include an operating system, application programs, other program modules, and program data.

The computer 1210 may also include other removable/non-removable, volatile/nonvolatile computer storage media. For example, computer 1210 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1221 through a non-removable memory interface such as an interface, and a magnetic disk drive or optical disk drive is typically connected to the system bus 1221 by a removable memory interface, such as an interface.

A user can enter commands and information into the computer 1210 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1220 through user input 1240 and associated interface(s) that are coupled to the system bus 1221, but may be connected by other interface and bus structures, such as a parallel port, game port, or a universal serial bus (USB). A graphics subsystem can also be connected to the system bus 1221. A projection unit in a projection display device, or a HUD in a viewing device or other type of display device can also be connected to the system bus 1221 via an interface, such as output interface 1250, which may in turn communicate with video memory. In addition to a monitor, computers can also include other peripheral output devices such as speakers which can be connected through output interface 1250.

The computer 1210 can operate in a networked or distributed environment using logical connections to one or more other remote computer(s), such as remote computer 1270, which can in turn have media capabilities different from device 1210. The remote computer 1270 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1210. The logical connections depicted in FIG. 12 include a network 1271, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1210 can be connected to the LAN 1271 through a network interface or adapter. When used in a WAN networking environment, the computer 1210 can typically include a communications component, such as a modem, or other means for establishing communications over the WAN, such as the Internet. A communications component, such as wireless communications component, a modem and so on, which can be internal or external, can be connected to the system bus 1221 via the user input interface of input 1240, or other appropriate mechanism. In a networked environment, program modules depicted relative to the computer 1210, or portions thereof, can be stored in a remote memory storage device. It will be appreciated that the network connections shown and described are exemplary and other means of establishing a communications link between the computers can be used.

Example Networking Environment

Figure 13:
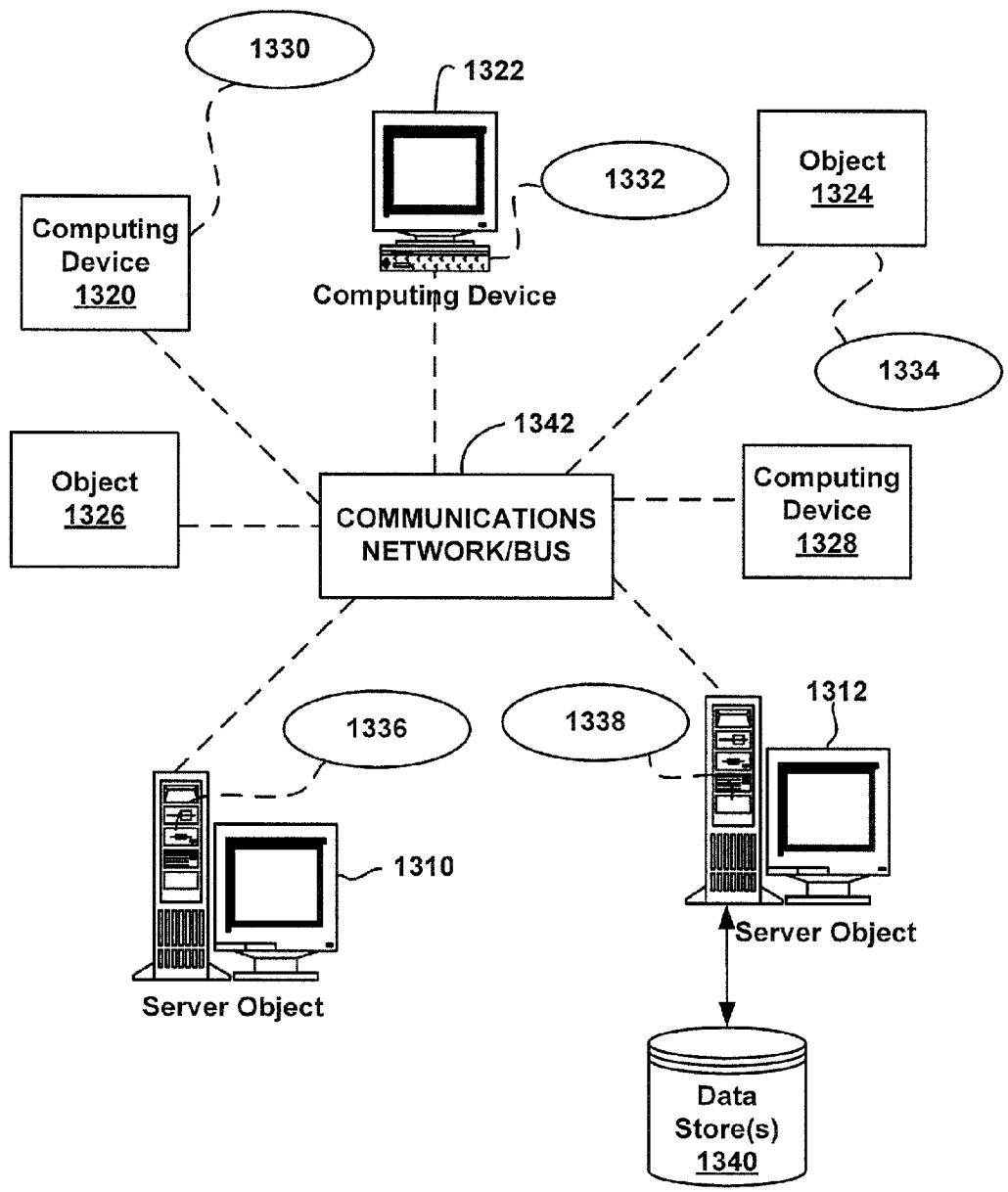
FIG. 13 illustrates a block diagram of an example data communication network that can be operable in conjunction with various aspects described herein.

FIG. 13 provides a schematic diagram of an exemplary networked or distributed computing environment. The distributed computing environment comprises computing objects 1310, 1312, etc. and computing objects or devices 1320, 1322, 1324, 1326, 1328, etc., which may include programs, methods, data stores, programmable logic, etc., as represented by applications 1330, 1332, 1334, 1336, 1338 and data store(s) 1340. It can be appreciated that computing objects 1310, 1312, etc. and computing objects or devices 1320, 1322, 1324, 1326, 1328, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1340 can include memory 104, gather buffer 106 and/or memory 402, or other similar data stores disclosed herein.

Each computing object 1310, 1312, etc. and computing objects or devices 1320, 1322, 1324, 1326, 1328, etc. can communicate with one or more other computing objects 1310, 1312, etc. and computing objects or devices 1320, 1322, 1324, 1326, 1328, etc. by way of the communications network 1342, either directly or indirectly. Even though illustrated as a single element in FIG. 13, communications network 1342 may comprise other computing objects and computing devices that provide services to the system of FIG. 13, and/or may represent multiple interconnected networks, which are not shown. Each computing object 1310, 1312, etc. or computing object or devices 1320, 1322, 1324, 1326, 1328, etc. can also contain an application, such as applications 1330, 1332, 1334, 1336, 1338, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 13, as a non-limiting example, computing objects or devices 1320, 1322, 1324, 1326, 1328, etc. can be thought of as clients and computing objects 1310, 1312, etc. can be thought of as servers where computing objects 1310, 1312, etc., acting as servers provide data services, such as receiving data from client computing objects or devices 1320, 1322, 1324, 1326, 1328, etc., storing of data, processing of data, transmitting data to client computing objects or devices 1320, 1322, 1324, 1326, 1328, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1342 or bus is the Internet, for example, the computing objects 1310, 1312, etc. can be Web servers with which other computing objects or devices 1320, 1322, 1324, 1326, 1328, etc. communicate via any of a number of known protocols, such as the hypertext transfer protocol (HTTP). Computing objects 1310, 1312, etc. acting as servers may also serve as clients, e.g., computing objects or devices 1320, 1322, 1324, 1326, 1328, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
a classifier engine configured to classify network segments based on a source address, a destination address, a source port and a destination port, wherein the classifier engine splits a network segment into a packet header and packet data,
a first memory configured to store packet headers associated with the network segments, wherein the first memory is on-chip memory;
a gather buffer configured to store packet data associated with the network segments based at least in part on a sequence number stored in each of the packet headers; and
a processor configured for receiving the packet headers and generating a single packet header for the network segments that are in a predetermined sequence in response to a determination that the gather buffer storing the packet data for the network segments has reached a predetermined size, and the processor is further configured for generating another single packet header for previously gathered packet data in response to receiving a network segment that is not in a predetermined sequence wherein the processor is distinct from a central processing unit of a system on a chip and the processor, the first memory, and the classifier engine are embedded on the system on a chip.

2. The system of claim 1, wherein the processor generates a single network segment that comprises the single packet header and the packet data stored in the gather buffer.

3. The system of claim 2, wherein the processor sends the single network segment to a central processing unit (CPU).

4. The system of claim 3, wherein the CPU implements a higher level network protocol than the processor.

5. The system of claim 1, wherein the processor generates the single packet header for the network segments in response to a determination that a flow timeout occurred.

6. The system of claim 1, wherein the processor is further configured for receiving messages associated with the packet headers from a queue manager.

7. The system of claim 1, wherein the processor is further configured for storing a segment size and memory address for each of the packet headers in a second memory.

8. The system of claim 7, wherein the packet data for the network segments is stored in the second memory.

9. The system of claim 1, wherein a data stream associated with the network segments is a Transmission Control Protocol (TCP) data stream.

10. The system of claim 1, wherein the classifier engine comprises rules associated with network socket addresses for the network segments.

11. The system of claim 10, wherein the rules are based on a 4-tuple connection key.

12. The system of claim 1, wherein the another single packet header is associated with network segments processed before the network segment that is not in the predetermined sequence.

13. A method, comprising:
classifying, by a classifier engine embedded on a system on a chip, a network segment based on a source address, a destination address, a source port and a destination port;
splitting, by the classifier engine, the network segment into a packet header and packet data;
storing the packet header associated with the network segment in a first memory, wherein the first memory is on-chip memory;
storing packet data for the network segment in a gather buffer based at least in part on a sequence number stored in each of the packet header;
receiving, by a processor on the system on a chip that is distinct from a central processing unit of the system on a chip, the packet header;
generating, by the processor, a single packet header for a set of stored network segments that are in a predetermined sequence in response to a determination that the gather buffer that stores the packet data for the network segment has reached a predetermined memory size; and
generating, by the processor, another single packet header for previously gathered packet data in response to receiving a network segment that is not in the predetermined sequence.

14. The method of claim 13, wherein the storing the packet data for the network segment in the gather buffer further comprises storing the packet data for the network segment in the gather buffer in response to a determination that the sequence number associated with the network segment matches a predetermined sequence number for the network segment.

15. The method of claim 13, further comprising generating a new network segment that comprises the single packet header and the packet data stored in the gather buffer.

16. The method of claim 15, further comprising sending the new network segment to a central processing unit.

17. The method of claim 13, wherein the generating the single packet header for the set of stored network segments comprises generating the single packet header for the set of stored network segments in response to a determination that a flow timeout has occurred.

18. The method of claim 13, further comprising receiving a message associated with the packet header.

19. The method of claim 13, wherein the another single packet header is associated with network segments processed before the network segment that is not in the predetermined sequence.

20. A tangible computer-readable storage device storing executable instructions that, in response to execution, cause a system comprising a processor to perform operations comprising:
classifying, by a classifier engine, a network segment with a 4-tuple connection key lookup based on a source address, a destination address, a source port and a destination port;
splitting, by the classifier engine, the network segment into a packet header and packet data;
storing the packet header associated with the network segment in an on-chip memory of a system on a chip;
storing packet data for the network segment in a gather buffer based at least in part on a sequence number stored in each of the packet header;
receiving, by a processor on the system on the chip that is distinct from a central processing unit of the system on the chip, the packet header;
generating, by the processor, a single packet header for a set of stored network segments that are in a predetermined sequence in response to a determination that the gather buffer that stores packet data for the network segment has reached a predetermined size; and
generating, by the processor, another single packet header for previously gathered packet data in response to receiving a network segment that is not in the predetermined sequence.

* * * * *